US012621626B2

(12) United States Patent
Jang et al.

(10) Patent No.: US 12,621,626 B2
(45) Date of Patent: May 5, 2026

(54) METHOD AND APPARATUS FOR GENERATING AUDIO SIGNAL, AND METHOD AND APPARATUS FOR REPRODUCING AUDIO SIGNAL

(71) Applicant: Electronics and Telecommunications Research Institute, Daejeon (KR)

(72) Inventors: Dae Young Jang, Daejeon (KR); Kyeongok Kang, Daejeon (KR); Jae-hyoun Yoo, Daejeon (KR); Yong Ju Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 151 days.

(21) Appl. No.: 18/409,013

(22) Filed: Jan. 10, 2024

(65) Prior Publication Data

US 2025/0227429 A1 Jul. 10, 2025

(30) Foreign Application Priority Data

Jan. 11, 2023 (KR) ........................ 10-2023-0004235
Jan. 10, 2024 (KR) ........................ 10-2024-0004241

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01)

(58) Field of Classification Search
CPC ...... H04S 7/303; H04S 3/008; H04S 2400/01; H04S 2400/11; H04S 2420/01
USPC ............................. 381/303, 300, 1, 310, 307
See application file for complete search history.

(56) References Cited

U.S. PATENT DOCUMENTS

2009/0316939 A1* 12/2009 Matsumoto ............... H04S 7/30 381/302
2020/0234718 A1 7/2020 Lee et al.
2021/0258709 A1 8/2021 Jang et al.

FOREIGN PATENT DOCUMENTS

KR 10-2019-0097799 A 8/2019
KR 10-2021-0102353 A 8/2021

OTHER PUBLICATIONS

Daeyoung Jang, et al. "Core Experiment on Combination of Headphone and Loudspeaker Reproduction" *International Organisation for Standardisation ISO/IEC JTC1/SC29/WG6, MPEG Audio Coding* (Jan. 2023).

* cited by examiner

*Primary Examiner* — Thjuan K Addy
(74) *Attorney, Agent, or Firm* — NSIP Law

(57) ABSTRACT

A method and device for generating an audio signal and a method and device for reproducing an audio signal are provided. The method of reproducing an audio signal includes obtaining a type of a stereophonic sound signal determined according to characteristics of the stereophonic sound signal and determining a rendering mode to reproduce the stereophonic sound signal, based on the type of the stereophonic sound signal and a reproduction environment of the stereophonic sound signal.

15 Claims, 8 Drawing Sheets

METHOD AND APPARATUS FOR GENERATING AUDIO SIGNAL, AND METHOD AND APPARATUS FOR REPRODUCING AUDIO SIGNAL

CROSS REFERENCE TO RELATED APPLICATIONS

This application claims the benefit under 35 USC § 119(a) of Korean Patent Application No. 10-2023-0004235, filed on Jan. 11, 2023, and Korean Patent Application No. 10-2024-0004241, filed on Jan. 10, 2024, in the Korean Intellectual Property Office, the entire disclosures of which are incorporated herein by reference for all purpose.

TECHNICAL FIELD

One or more embodiments relate to a method and device for generating an audio signal and a method and device for reproducing an audio signal.

TECHNOLOGY BEHIND THE INVENTION

Recently, attempts to provide more immersive stereophonic sound have been increasing, especially in digital cinema, such as ultra-high-definition television (UHDTV) and virtual reality (VR) games/attractions. In the case of digital cinema, Barco's AURO-3D has provided an opportunity to express stereophonic sound not only on a horizontal plane but also on a vertical plane by attempting to provide hemispherical stereophonic sound by adding four channels installed on the ceiling to the existing 5.1 channels. Afterwards, Dolby corporation has recognized the limitation of a multi-channel-based audio format and has commercialized Atmos technology for adapting to various audio reproduction environments by introducing audio technology of a hybrid format including an object-based audio format. Digital Theater Systems (DTS) has also entered the movie and home theater market using DTS-X technology, which is similar to Atmos, and is also competing with Dolby in the field of realistic media such as VR.

In addition, standardization organizations are also establishing standardization for the audio technology of such hybrid formats. Audio definition model (ADM) according to international telecommunication union (ITU) specifies metadata for expressing information in various audio formats including an object-based audio format. Advanced television systems committee (ATSC) 3.0, a next-generation broadcasting standard in America, has standardized to include the audio technology of such hybrid formats and defines that Dolby's AC4 technology and Moving Picture Experts Group (MPEG)-H three-dimensional (3D) audio technology may be selected and used.

Although standardization and technology have been developed to provide the audio technology of hybrid formats, the technologies are dependent on one of existing rendering modes and thus, immersive stereophonic sound may not be reproduced.

The above description has been possessed or acquired by the inventor(s) in the course of conceiving the present disclosure and is not necessarily an art publicly known before the present application is filed.

CONTENTS OF THE INVENTION

Tasks to be Solved

Embodiments provide technology of determining a rendering mode to reproduce a stereophonic sound signal, based on the type of the stereophonic sound signal and a reproduction environment of the stereophonic sound signal, and reproducing different stereophonic sound signals through a plurality of rendering modes.

However, the technical aspects are not limited to the aforementioned aspects, and other technical aspects may be present.

Means of Solving the Tasks

According to an aspect, there is provided a method of generating an audio signal, the method including determining a type of a stereophonic sound signal based on characteristics of the stereophonic sound signal and generating metadata of a sound source for generating the stereophonic sound signal, based on the determined type of the stereophonic sound signal.

The characteristics of the stereophonic sound signal may include a format of the sound source and a user reachable region corresponding to a region where the stereophonic sound signal may be experienced.

The determining of the type of the stereophonic sound signal may include, when the format of the sound source is an object-based sound source, determining the stereophonic sound signal as foreground sound and when the format of the sound source is a channel-based sound source, determining the stereophonic sound signal as background sound.

According to another aspect, there is provided a method of reproducing an audio signal, the method including obtaining a type of a stereophonic sound signal determined according to characteristics of the stereophonic sound signal and determining a rendering mode to reproduce the stereophonic sound signal, based on the type of the stereophonic sound signal and a reproduction environment of the stereophonic sound signal.

The type of the stereophonic sound signal may include foreground sound and background sound.

The reproduction environment of the stereophonic sound signal may include a position of a speaker to reproduce the stereophonic sound signal and a distance between a sound source for generating the stereophonic sound signal and a listener.

The rendering mode may include a multi-channel rendering mode and a binaural rendering mode.

The determining of the rendering mode may include determining an initial value of the rendering mode based on the type of the stereophonic sound signal and determining a final rendering mode to reproduce the stereophonic sound signal, based on the initial value of the rendering mode and the reproduction environment of the stereophonic sound signal.

The determining the initial value of the rendering mode may include, when the type of stereophonic sound signal is foreground sound, determining the binaural rendering mode to be an initial value and when the type of stereophonic sound signal is background sound, determining the multi-channel rendering mode to be an initial value.

The determining of the final rendering mode may include determining whether to change the initial value of the rendering mode based on the distance between the sound source and the listener.

According to another aspect, there is provided an electronic device for reproducing an audio signal, the electronic device including a processor and a memory configured to store instructions, wherein the instructions, when executed by the processor, may cause the electronic device to obtain a type of a stereophonic sound signal determined according to characteristics of the stereophonic sound signal and determine a rendering mode to reproduce the stereophonic sound signal, based on the type of the stereophonic sound signal and a reproduction environment of the stereophonic sound signal.

The type of the stereophonic sound signal may include foreground sound and background sound.

The reproduction environment of the stereophonic sound signal may include a position of a speaker to reproduce the stereophonic sound signal and a distance between a sound source for generating the stereophonic sound signal and a listener.

The rendering mode may include a multi-channel rendering mode and a binaural rendering mode.

The instructions, when executed by the processor, may cause the electronic device to determine an initial value of the rendering mode based on the type of the stereophonic sound signal and determine a final rendering mode to reproduce the stereophonic sound signal, based on the initial value of the rendering mode and the reproduction environment of the stereophonic sound signal.

The instructions, when executed by the processor, may cause the electronic device to, when the type of stereophonic sound signal is foreground sound, determine the binaural rendering mode to be an initial value and when the type of stereophonic sound signal is background sound, determine the multi-channel rendering mode to be an initial value.

The instructions, when executed by the processor, may cause the electronic device to determine whether to change the initial value of the rendering mode based on the distance between the sound source and the listener.

DETAILED DESCRIPTION

Figure 1:
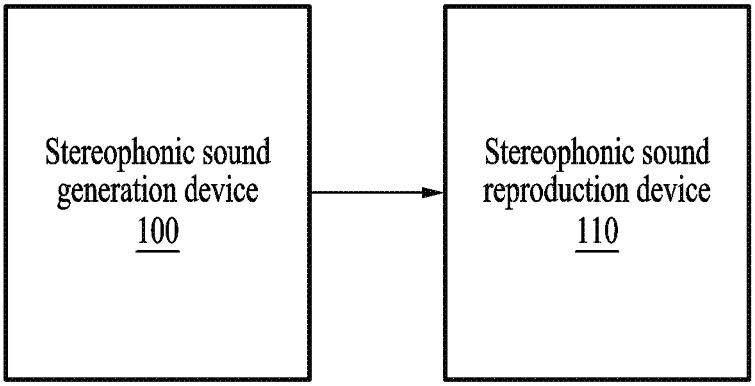
FIG. 1 illustrates a stereophonic sound generation device and a stereophonic sound reproduction device, according to an embodiment.

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, embodiments will be described in detail with reference to the accompanying drawings. When describing the embodiments with reference to the accompanying drawings, like reference numerals refer to like components and a repeated description related thereto will be omitted.

FIG. 1 illustrates a stereophonic sound generation device and a stereophonic sound reproduction device, according to an embodiment.

Referring to FIG. 1, a stereophonic sound generation device 100 may generate a stereophonic sound signal and may transmit the stereophonic sound signal to a stereophonic sound reproduction device 110. FIG. 1 is only an example of the present disclosure, and the scope of the present disclosure is not limited thereto. For example, the stereophonic sound generation device 100 and the stereophonic sound reproduction device 110 may be implemented as a single electronic device.

A sound source may generate a stereophonic sound signal. A format of the sound source may include an object-based sound source and a channel-based sound source. The object-based sound source and the channel-based sound source may be sound signals generated in one scene and divided by an object and a channel (e.g., a background). For example, in the case of a scene where a listener is in a valley, the channel-based sound source may be background sound such as the sound of water or wind, and the object-based sound source may be sound generated by a specific object, such as the sound of birds or bees.

A channel sound signal (e.g., the stereophonic sound signal generated by the channel-based sound source) may be reproduced using a multi-channel rendering mode. An object sound signal (e.g., the stereophonic sound signal generated by the object-based sound source) may be reproduced using a multi-channel rendering mode by panning, binaural rendering mode, transaural rendering mode, sound field synthesis rendering mode, and other multi-channel rendering modes. The channel sound signal and the object sound signal may be reproduced using other rendering modes in addition to the above rendering modes.

The stereophonic sound generation device 100 may determine the type of a stereophonic sound signal (e.g., background sound and foreground sound) to determine a rendering mode of the stereophonic sound signal (e.g., the channel sound signal and the object sound signal). Hereinafter, a method of determining the type of the stereophonic sound signal is described in detail.

The stereophonic sound generation device 100 may determine the type of the stereophonic sound signal based on characteristics of the stereophonic sound signal. Characteristics of the stereophonic sound signal may include a format of the sound source that generates the stereophonic sound signal and a user reachable region. The user reachable region may include a region corresponding to a region where the stereophonic sound signal may be experienced. The region where the stereophonic sound signal may be experienced may refer to a region where the stereophonic sound signal may be heard. For example, the user reachable region may include the area where stereophonic sound is heard from the sound source that generates the stereophonic sound signal.

The stereophonic sound generation device 100 may determine the sound signal generated by the channel-based sound source as the background sound.

The stereophonic sound generation device 100 may determine the sound signal generated by the object-based sound source as the foreground sound. However, the embodiments are not limited thereto, and even in the case of the stereophonic sound signal generated by the object-based sound source, the stereophonic sound generation device 100 may determine the stereophonic sound signal generated by the object-based sound source as the background sound based on the user reachable region. For example, when the format of the sound source is the object-based sound source, the stereophonic sound generation device 100 may determine the stereophonic sound signal as the foreground sound. In another example, even in the case where the format of the sound source of the stereophonic sound signal is an object-based sound source, when the position of the sound source is fixed and a listener is outside the user reachable region (e.g., including the region where the stereophonic sound is heard from the sound source that generates the stereophonic sound signal), the stereoscopic sound signal may be determined as the background sound.

The stereophonic sound generation device 100 may generate metadata of the sound source that generates the stereophonic sound signal based on the determined type of the stereophonic sound signal. The stereophonic sound generation device 100 may generate metadata including a rendering mode (e.g., an initial value of a rendering mode in which the stereophonic sound signal is reproduced by the stereophonic sound reproduction device 110) determined by reflecting the type of the stereophonic sound signal.

Hereinafter, when the type of the stereophonic sound signal is determined by the stereophonic sound generation device 100, a method of reproducing the stereophonic sound signal by receiving the metadata (e.g., the metadata including the rendering mode (e.g., the initial value of the rendering mode in which the stereophonic sound signal is reproduced by the stereophonic sound reproduction device 110) determined by reflecting the type of the stereophonic sound signal) from the stereophonic sound generation device 100 by the stereophonic sound reproduction device 110 is described in detail.

The stereophonic sound reproduction device 110 may obtain the type of the stereophonic sound signal. For example, the stereophonic sound reproduction device 110 may obtain (e.g., receive) the metadata from the stereophonic sound generation device 100. The stereophonic sound reproduction device 110 may obtain the type of the stereophonic sound signal based on the metadata.

The stereophonic sound reproduction device 110 may determine the rendering mode to reproduce the stereophonic sound signal, based on the type of the stereophonic sound signal and a reproduction environment of the stereophonic sound signal. The reproduction environment of the stereophonic sound signal may include a position of a speaker to reproduce the stereophonic sound signal and the distance between the sound source that generates the stereophonic sound signal and a listener. The rendering mode may include a multi-channel rendering mode and a binaural rendering mode but is not limited thereto.

The stereophonic sound reproduction device 110 may determine the initial value of the rendering mode based on the type of the stereophonic sound signal. For example, when the stereophonic sound signal is background sound, the stereophonic sound reproduction device 110 may determine the multi-channel rendering mode to be the initial value, and when the stereophonic sound signal is foreground sound, the stereophonic sound reproduction device 110 may determine the binaural rendering mode to be the initial value. However, the initial value of the rendering mode may change depending on the reproduction environment of the stereophonic sound signal, which is described in detail below.

The stereophonic sound reproduction device 110 may determine the final rendering mode, based on the initial value of the rendering mode and the reproduction environment of the stereophonic sound signal. The reproduction environment of the stereophonic sound signal may include a position of a speaker to reproduce the stereophonic sound signal and the distance between the sound source that generates the stereophonic sound signal and a listener.

The stereophonic sound reproduction device 110 may determine whether to change the initial value of the rendering mode based on the reproduction environment of the stereophonic sound signal. When the initial value of the rendering mode is changed, the stereophonic sound reproduction device 110 may determine the changed rendering mode to be the final rendering mode, and when the initial value of the rendering mode is not changed, the stereophonic sound reproduction device 110 may determine the initial value of the rendering mode to be the final rendering mode.

The stereophonic sound reproduction device 110 may determine whether to change the initial value of the rendering mode based on the distance between the sound source (e.g., the sound source that generates the stereophonic sound signal) and the listener. For example, when the initial value of the rendering mode is the multi-channel rendering mode, the initial value of the rendering mode may not change based on the distance between the sound source and the listener. However, when the initial value of the rendering mode is the binaural rendering mode, the initial value of the rendering mode may be changed according to the following conditions. When the distance between the sound source and the listener is greater than a preset distance (e.g., 2 meters (m) or half the distance at which the output of a speaker may be heard), the stereophonic sound reproduction device 110 may change the initial value of the rendering mode from the binaural rendering mode to the multi-channel rendering mode. This is because, when the distance between the sound source and the listener is greater than the preset distance, the stereophonic sound signal is closer to the characteristics of the background sound, even in the case where the stereophonic sound signal is generated by the object-based sound source.

The stereophonic sound reproduction device 110 may reproduce the stereophonic sound signal through the final rendering mode. Although a single stereophonic sound signal has been described above, a method of generating stereophonic sound and a method of reproducing stereophonic sound, which are respectively performed by the stereophonic sound generation device 100 and the stereophonic sound reproduction device 110, may be equally performed in parallel for a plurality of stereophonic sound signals. For example, the stereophonic sound reproduction device 110 may simultaneously reproduce each stereophonic sound signal through the final rendering mode determined for each of the plurality of stereophonic sound signals.

Figure 2A:
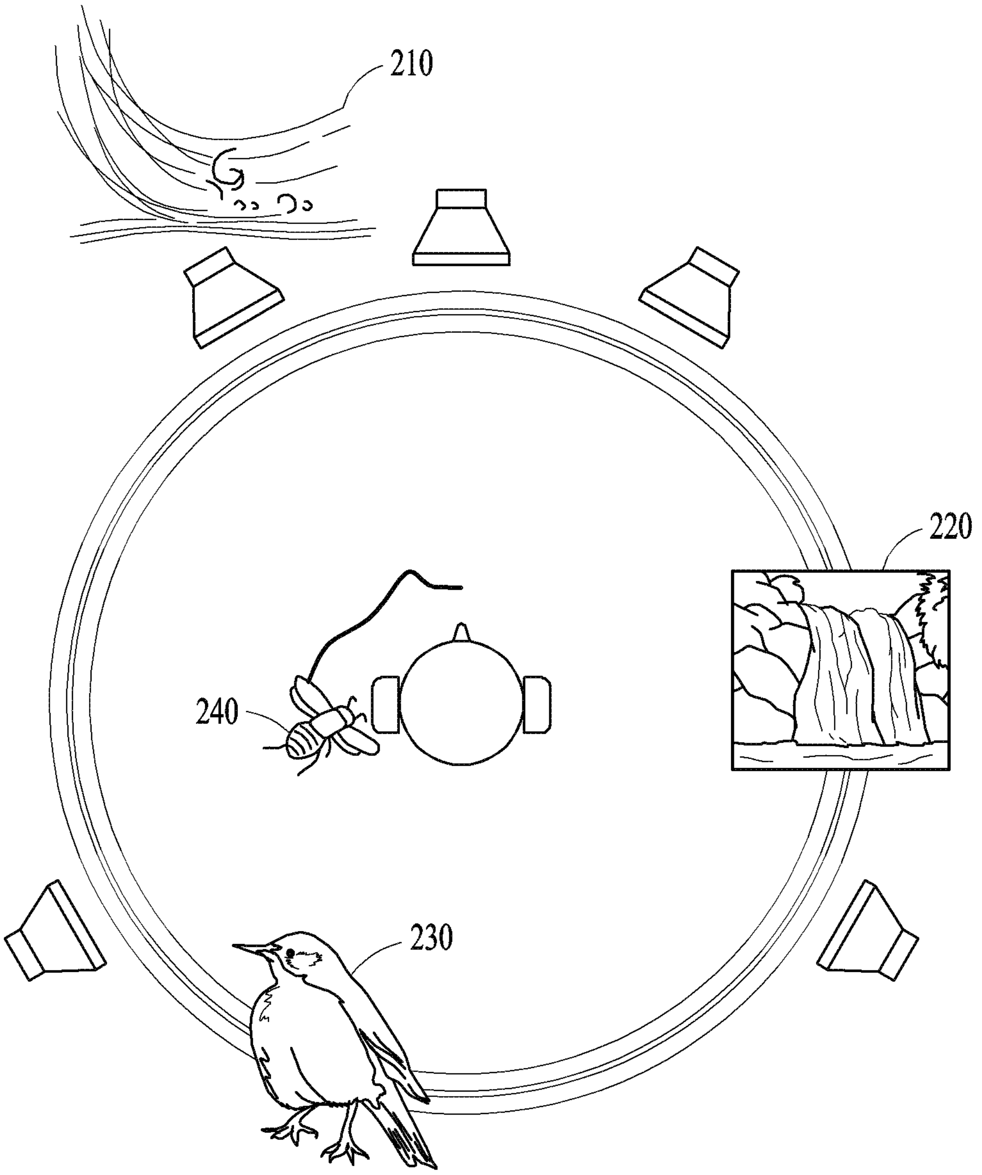
FIGS. 2*a* and 2*b* are diagrams illustrating an operation of reproducing a stereophonic sound signal using a plurality of rendering modes, according to an embodiment.
Figure 2B:
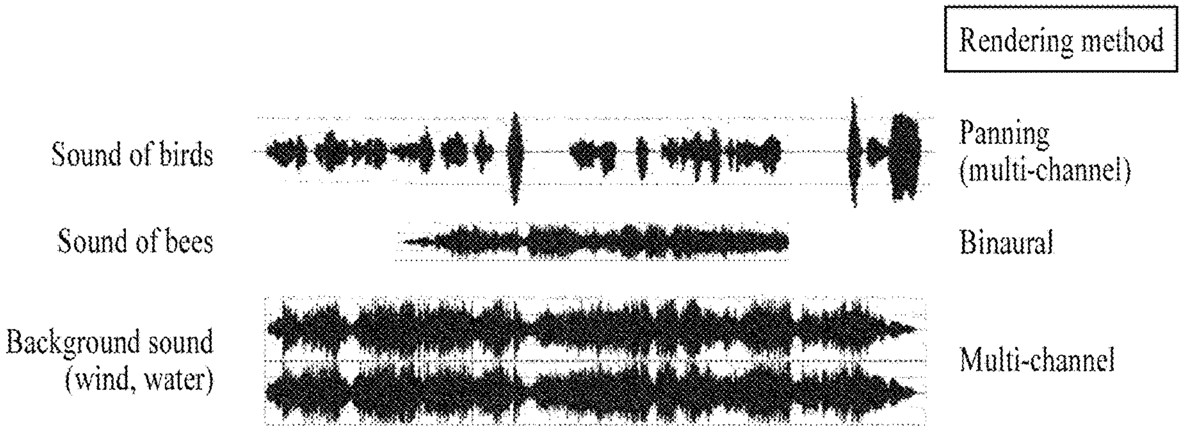

FIGS. 2*a* and 2*b* are diagrams illustrating an operation of reproducing a stereophonic sound signal using a plurality of rendering modes, according to an embodiment.

FIG. 2*a* illustrates sound of wind 210, sound of water 220, sound of birds 230, and sound of bees 240 and FIG. 2*b* illustrates a rendering mode for each sound.

The sound of wind 210 and the sound of water 220 may be stereophonic sound signals generated by a channel-based sound source and the sound of birds 230 and the sound of bees 240 may be stereophonic sound signals generated by an object-based sound source. The sound of wind 210 and the sound of water 220 may be determined as background sounds. Although the sound of birds 230 is generated by the object-based sound source, the sound of birds 230 may be determined as background sound because a listener is outside a user reachable region from the sound source. The sound of bees 240 may be determined as foreground sound, since the sound of bees 240 is generated by the object-based sound source and is within the user reachable region from the sound source.

A channel sound signal, such as the sound of wind 210 and the sound of water 220, may be reproduced using a multi-channel rendering mode. Referring to FIG. 2*a*, a 5.1 multi-channel rendering mode is used, but the channel sound signal may be reproduced by being converted according to a channel format of a stereophonic sound reproduction device.

An object sound signal 1, which is the sound of birds 230, may be reproduced using a multi-channel rendering mode by panning. In addition, an object sound signal 2, which is the sound of bees 240, may be reproduced using a binaural rendering mode. Here, the binaural rendering mode may be reproduced through headphones, and in order to be heard with the sound of a multi-channel speaker, open headphones, neckband-type headphones, or headrest-attached near field speakers may be used.

Therefore, while listening to the sound of wind 210 and the sound of water 220 as background sounds through a multi-channel speaker, a user may listen to the sound of birds 230 through a multi-channel speaker by panning and the sound of bees 240 through headphones.

Figure 3A:
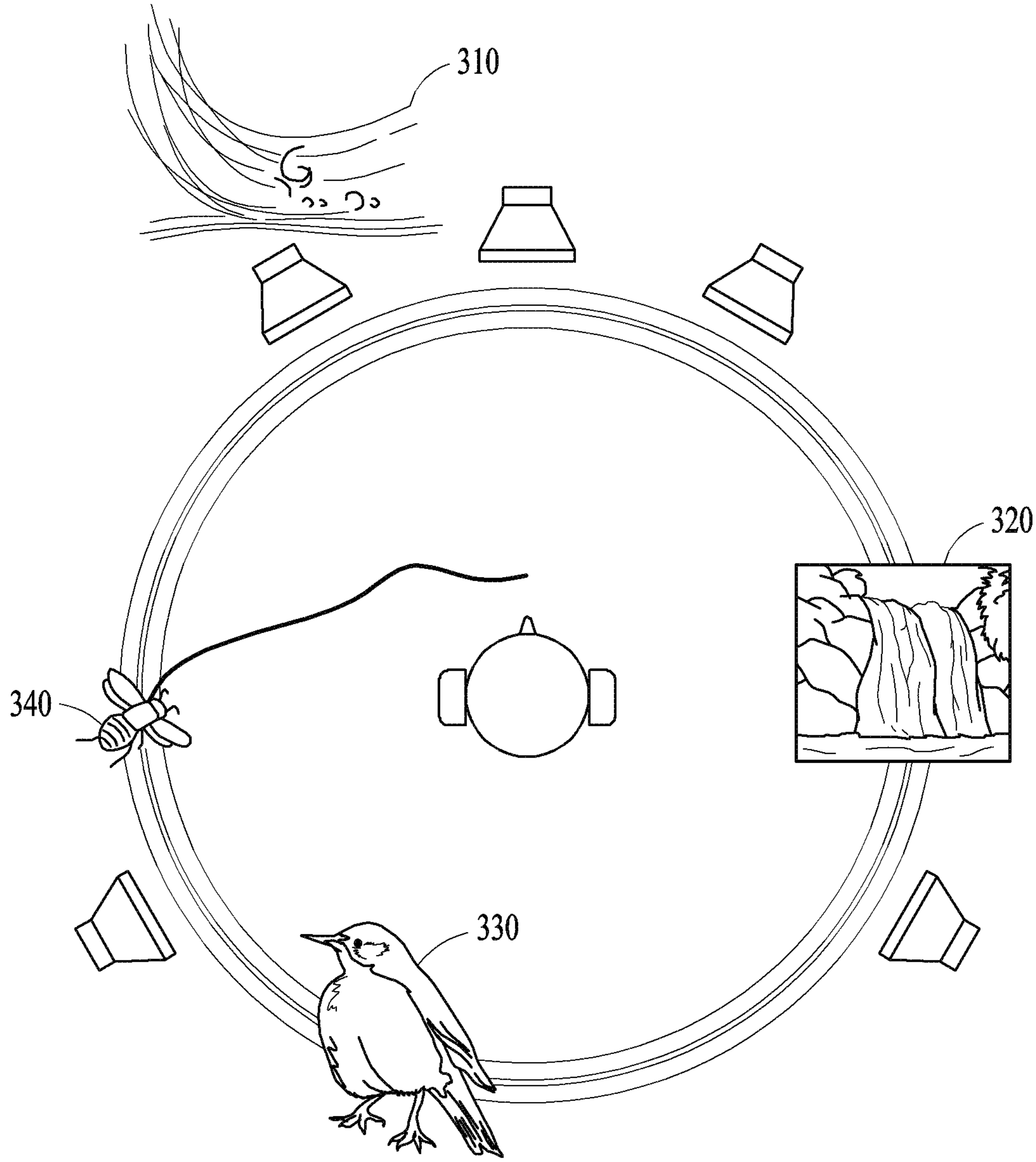
FIGS. 3*a* and 3*b* are diagrams illustrating an operation of reproducing a stereophonic sound signal using a plurality of rendering modes, according to another embodiment.
Figure 3B:
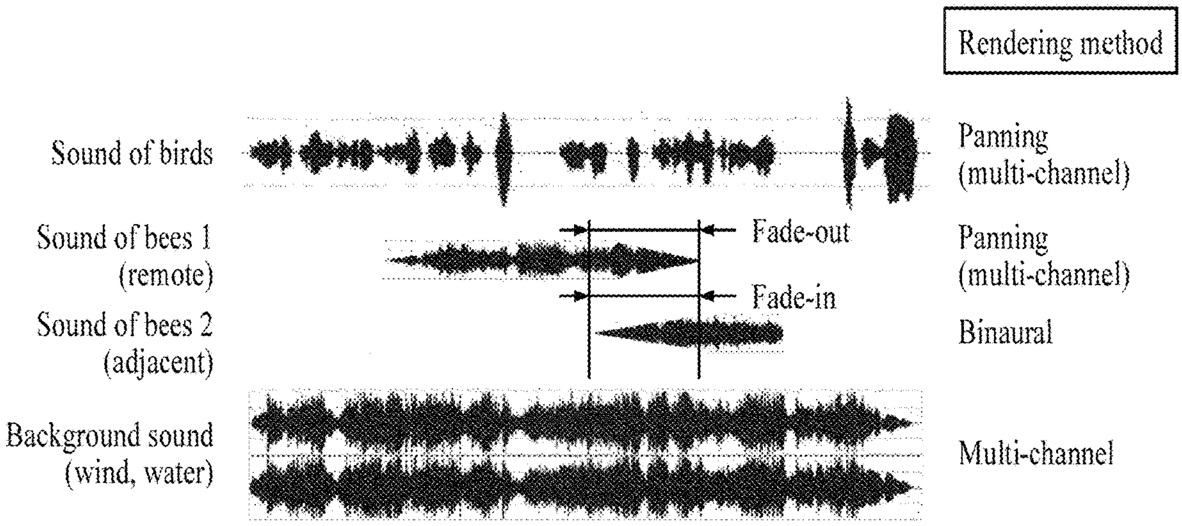

FIGS. 3*a* and 3*b* are diagrams illustrating an operation of reproducing a stereophonic sound signal using a plurality of rendering modes, according to another embodiment.

Specifically, FIG. 3*a* illustrates sound of wind 310, sound of water 320, sound of birds 330, and sound of bees 340, and FIG. 3*b* illustrates a rendering mode for each sound. Here, unlike FIG. 2, the sound of bees 340 of FIG. 3 may be reproduced using different rendering modes depending on the movement of bees over time. For example, the distance from a sound source to a listener may vary from the outside of a user reachable region to the inside of the user reachable region due to the movement of bees. For ease of description, sound of bees 1 may be defined as sound generated by the movement of bees located outside a preset standard (e.g., including the user reachable region) and sound of bees 2 may be defined as sound generated by the movement of bees located inside the preset standard.

The stereophonic sound generation device 100 may determine the sound of bees 1 as background sound and may determine the sound of bees 2 as foreground sound. The stereophonic sound generation device 100 may reproduce the sound of bees 1 through a multi-channel rendering mode and may reproduce the sound of bees 2 through a binaural rendering mode. Here, when the sound of bees 1 changes from the sound of bees 1 to the sound of bees 2 in continuous time, the rendering mode may naturally change from the multi-channel rendering mode to the binaural rendering mode by fading in/out.

Figure 4:
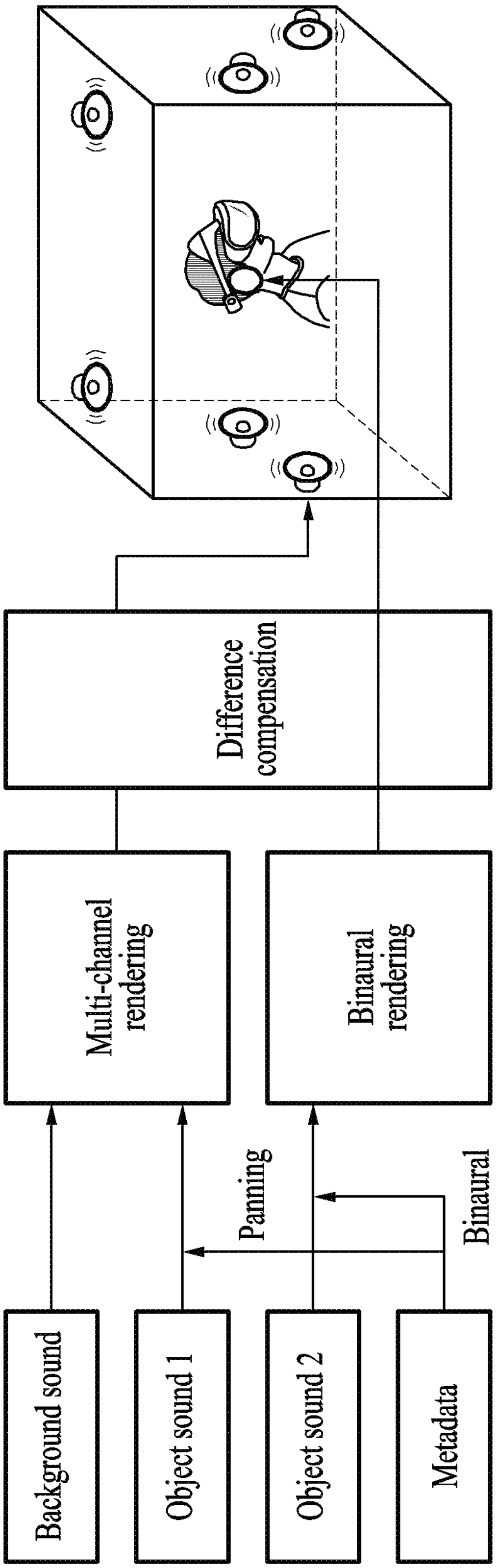
FIG. 4 is a diagram illustrating difference compensation based on a rendering mode when reproducing a channel sound signal and an object sound signal, according to an embodiment.

FIG. 4 is a diagram illustrating difference compensation based on a rendering mode when reproducing a channel sound signal and an object sound signal, according to an embodiment.

Referring to FIG. 4, a stereophonic sound reproduction device may reproduce a channel sound signal (e.g., a stereophonic sound signal generated by a channel-based sound source), an object sound signal (e.g., a stereophonic sound signal generated by an object-based sound source), and metadata. Here, the channel sound signal may represent background sound, object sounds 1 and 2 may represent the object sound signal, and the metadata may include a rendering mode of the object sound signal.

The metadata may include information on reproducing the object sound 1 by a multi-channel rendering mode by panning, and the metadata may also include information on reproducing the object sound 2 by a binaural rendering mode. Here, each object sound may be reproduced by each rendering mode according to the movement trajectory of the metadata.

Since the rendering mode for reproducing each object sound signal causes a difference according to the rendering mode, the stereophonic sound reproduction device may reproduce the channel sound signal and the object sound signal by compensating for the difference. Here, the difference may include delay time, volume, and tone but is not limited thereto, and other differences may also be included.

The stereophonic sound reproduction device may supplement/compensate for the delay time due to the difference in the rendering modes when reproducing the object sound 1 reproduced by the multi-channel rendering mode by panning and the object sound 2 reproduced by the binaural rendering mode. More specifically, the delay time caused by the distance between a multi-channel speaker in a listening environment and a listener may be supplemented/compensated for by adding delay time to the binaural rendering mode.

When reproducing the object sound 1 reproduced in the multi-channel rendering mode by panning and the object sound 2 reproduced in the binaural rendering mode, the stereophonic sound reproduction device may compensate for the tone due to the difference in the rendering modes using equalization.

The stereophonic sound reproduction device may supplement/compensate for the volume due to the difference in the rendering modes when reproducing the object sound 1 reproduced by the multi-channel rendering mode by panning and the object sound 2 reproduced by the binaural rendering mode. Here, the volume reproduced by each rendering mode may be supplemented/compensated for to be the same using a preset reference signal. Here, the preset reference signal may be determined by reflecting the characteristics of the object sound signal.

When the rendering mode determined by a stereophonic sound generation device may not be applied to the stereophonic sound reproduction device, the stereophonic sound reproduction device may reproduce the channel sound signal and the object sound signal according to an available rendering mode. For example, when the stereophonic sound generation device determines a 22.2 multi-channel rendering mode and a binaural rendering mode, but only a 5.1 multi-channel rendering mode is available in the stereophonic sound reproduction device, the stereophonic sound reproduction device may reproduce the channel sound signal and the object audio signal using the 5.1 multi-channel rendering mode. Accordingly, when the rendering mode determined by the stereophonic sound generation device may not be used, the channel sound signal and the object sound signal may be reproduced by converting to an available rendering mode of the stereophonic sound reproduction device.

Figure 5:
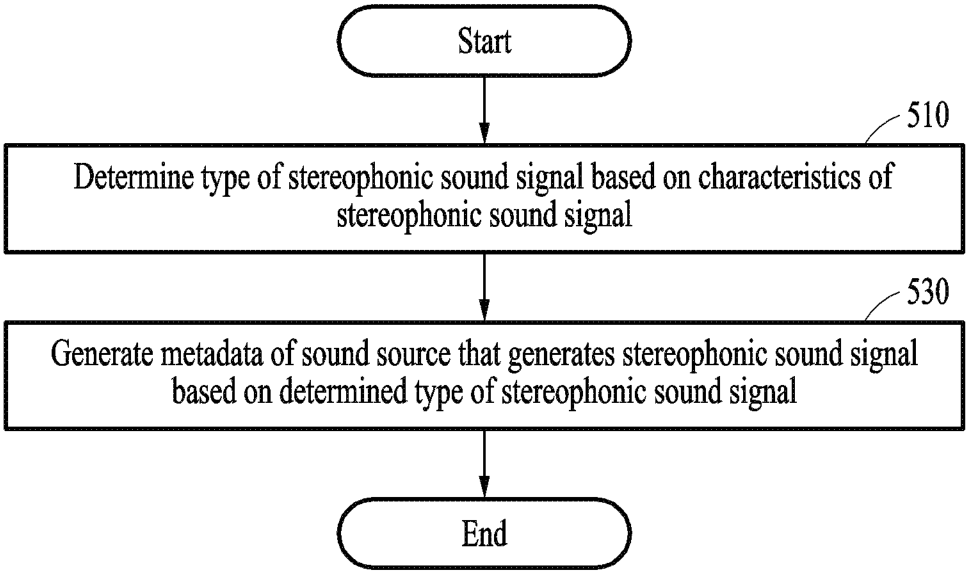
FIG. 5 is a flowchart illustrating an example of a method of generating an audio signal, according to an embodiment.

FIG. 5 is a flowchart illustrating an example of a method of generating an audio signal, according to an embodiment.

Referring to FIG. 5, operations 510 and 530 may be performed sequentially but are not limited thereto. For example, two or more operations may be performed in parallel. Operations 510 and 530 may be substantially the same as the operation of the training device (e.g., the stereophonic sound generation device 100 of FIG. 1) described with reference to FIGS. 1 to 4. Accordingly, further description thereof is not repeated herein.

In operation 510, the stereophonic sound generation device 100 may determine the type of a stereophonic sound signal based on the characteristics of the stereophonic sound signal. For example, the stereophonic sound generation device 100 may determine a channel sound signal (e.g., a stereophonic sound signal generated by a channel-based sound source) as background sound. In another example, when there is an object sound signal (e.g., a stereophonic sound signal generated by an object-based sound source) and a listener is within a user reachable region from a sound source, the stereophonic sound generation device 100 may determine the object sound signal as foreground sound. In another example, when there is an object sound signal and the listener is outside the user reachable region from the sound source, the stereophonic sound generation device 100 may determine the object sound signal as background sound.

In operation 530, the stereophonic sound generation device 100 may generate metadata of the sound source that generates the stereophonic sound signal based on the determined type of the stereophonic sound signal. The metadata may include data about an initial value of a rendering mode. The initial value of the rendering mode may be determined by reflecting the type of the stereophonic sound signal.

Figure 6:
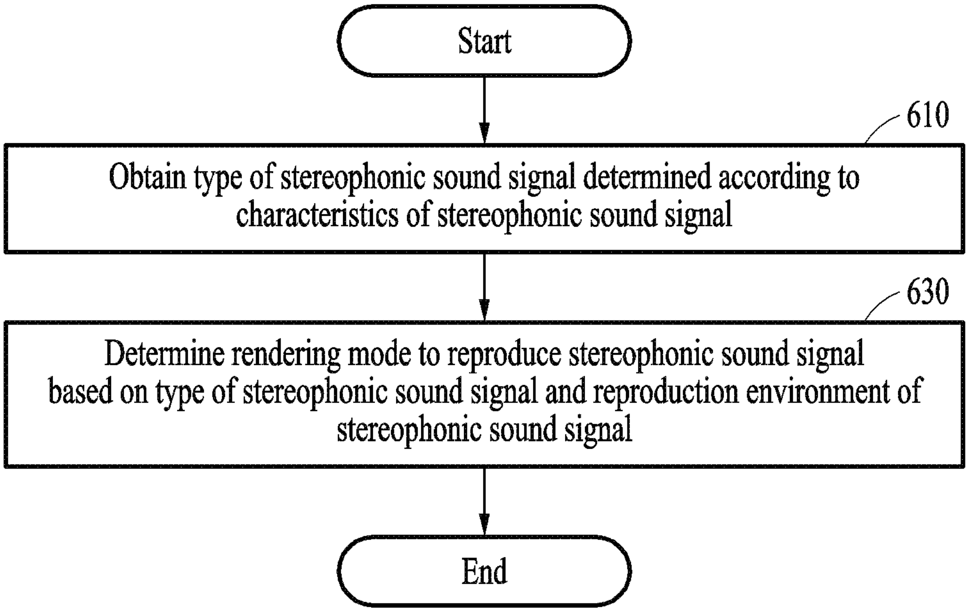
FIG. 6 is a flowchart illustrating an example of a method of reproducing an audio signal, according to an embodiment.

FIG. 6 is a flowchart illustrating an example of a method of reproducing an audio signal, according to an embodiment.

Referring to FIG. 6, operations 610 and 630 may be performed sequentially but are not limited thereto. For example, two or more operations may be performed in parallel. Operations 610 and 630 may be substantially the same as the operation of the training device (e.g., the stereophonic sound reproduction device 110 of FIG. 1) described with reference to FIGS. 1 to 4. Accordingly, further description thereof is not repeated herein.

In operation 610, the stereophonic sound reproduction device 110 may obtain the type of a stereophonic sound signal determined according to the characteristics of the stereophonic sound signal. For example, the stereophonic sound reproduction device 110 may obtain metadata (e.g., including data about an initial value of a rendering mode determined by reflecting the type of the stereophonic sound signal) from the stereophonic sound generation device 100. The stereophonic sound reproduction device 110 may obtain the type of the stereophonic sound signal based on the metadata.

In operation 630, the stereophonic sound reproduction device 110 may determine the rendering mode to reproduce the stereophonic sound signal, based on the type of the stereophonic sound signal and a reproduction environment of the stereophonic sound signal. The stereophonic sound reproduction device 110 may determine the initial value of the rendering mode based on the type of the stereophonic sound signal. The stereophonic sound reproduction device 110 may determine the final rendering mode based on a reproduction environment of the stereophonic sound signal (e.g., the distance between a sound source that generates the stereophonic sound signal and a listener).

Figure 7:
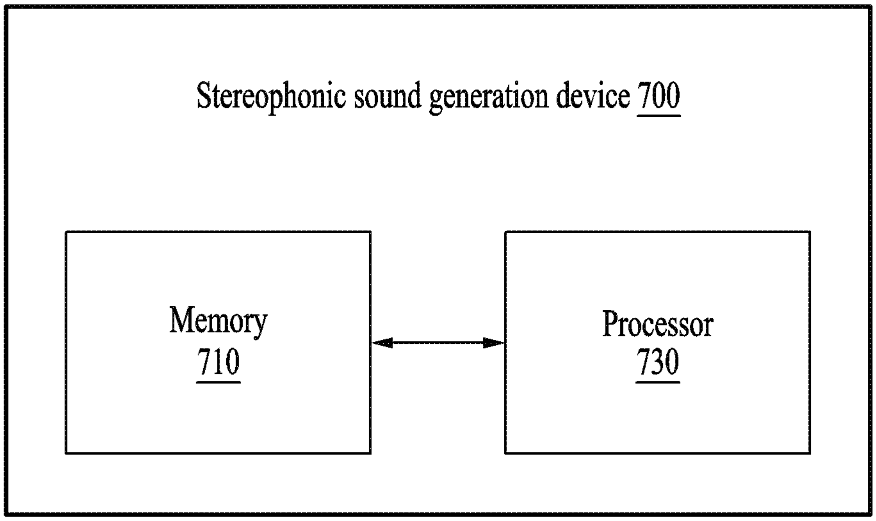
FIG. 7 illustrates an example of a stereophonic sound generation device according to an embodiment.

FIG. 7 illustrates an example of a stereophonic sound generation device according to an embodiment.

Referring to FIG. 7, a stereophonic sound generation device 700 (e.g., the stereophonic sound generation device 100 of FIG. 1) may include a memory 710 and a processor 730.

The memory 710 may store instructions (or programs) executable by the processor 730. For example, the instructions may include instructions to perform an operation of the processor 730 and/or an operation of each component of the processor 730.

The memory 710 may be implemented as a volatile memory device or a non-volatile memory device.

The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, a molecular electronic memory device, or insulator resistance change memory.

The processor 730 may process data stored in the memory 710. The processor 730 may execute computer-readable code (e.g., software) stored in the memory 710 and instructions triggered by the processor 730.

The processor 730 may be a hardware-implemented data processing device having a circuit that is physically structured to execute desired operations. The desired operations may include, for example, code or instructions in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 730 may cause the stereophonic sound generation device 700 to perform one or more operations by executing the code and/or instructions stored in the memory 710. Operations performed by the stereophonic sound generation device 700 may be substantially the same as operations performed by the stereophonic sound generation device 100 described with reference to FIGS. 1 to 6. Accordingly, a repeated description thereof is omitted.

Figure 8:
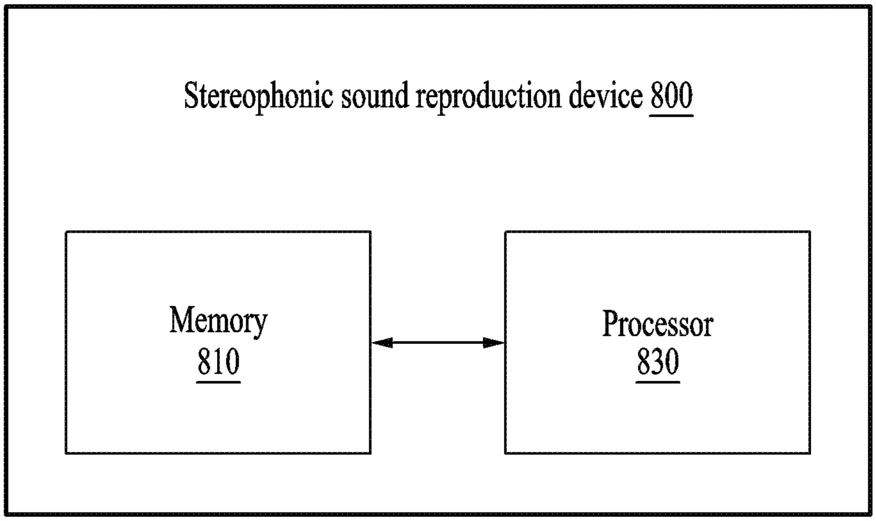
FIG. 8 illustrates an example of a stereophonic sound reproduction device according to an embodiment.

FIG. 8 illustrates an example of a stereophonic sound reproduction device according to an embodiment.

Referring to FIG. 8, a stereophonic sound reproduction device 800 (e.g., the stereophonic sound reproduction device 110 of FIG. 1) may include a memory 810 and a processor 830.

The memory 810 may store instructions (or programs) executable by the processor 830. For example, the instructions may include instructions to perform an operation of the processor 830 and/or an operation of each component of the processor 830.

The memory 810 may be implemented as a volatile memory device or a non-volatile memory device.

The volatile memory device may be implemented as DRAM, SRAM, T-RAM, Z-RAM, or TTRAM.

The non-volatile memory device may be implemented as EEPROM, flash memory, MRAM, STT-MRAM, CBRAM, FeRAM, PRAM, RRAM, nanotube RRAM, PoRAM, NFGM, holographic memory, a molecular electronic memory device, or insulator resistance change memory.

The processor 830 may process data stored in the memory 810. The processor 830 may execute computer-readable code (e.g., software) stored in the memory 810 and instructions triggered by the processor 830.

The processor 830 may be a hardware-implemented data processing device having a circuit that is physically structured to execute desired operations. The desired operations may include, for example, code or instructions in a program.

The hardware-implemented data processing device may include, for example, a microprocessor, a CPU, a processor core, a multi-core processor, a multiprocessor, an ASIC, and an FPGA.

The processor 830 may cause the stereophonic sound reproduction device 800 to perform one or more operations by executing the code and/or instructions stored in the memory 810. Operations performed by the stereophonic sound reproduction device 800 may be substantially the same as operations performed by the stereophonic sound reproduction device 110 described with reference to FIGS. 1 to 6. Accordingly, a repeated description thereof is omitted.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) discs and digital video discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

What is claimed is:

1. A method of generating an audio signal, the method comprising:

determining a type of a stereophonic sound signal based on characteristics of the stereophonic sound signal; and generating metadata of a sound source for generating the stereophonic sound signal, based on the determined type of the stereophonic sound signal, wherein the determining of the type of the stereophonic sound signal comprises:

when the format of the sound source is an object-based sound source, determining the stereophonic sound signal as foreground sound.

2. The method of claim 1, wherein the characteristics of the stereophonic sound signal comprise the format of the sound source and a user reachable region corresponding to a region where the stereophonic sound signal may be experienced.

3. The method of claim 2, wherein the determining of the type of the stereophonic sound signal further comprises:

when the format of the sound source is a channel-based sound source, determining the stereophonic sound signal as background sound.

4. A method of reproducing an audio signal, the method comprising:

obtaining a type of a stereophonic sound signal determined according to characteristics of the stereophonic sound signal; and determining a rendering mode to reproduce the stereophonic sound signal, based on the type of the stereophonic sound signal and a reproduction environment of the stereophonic sound signal, wherein the type of the stereophonic sound signal comprises foreground sound and background sound.

5. The method of claim 4, wherein the reproduction environment of the stereophonic sound signal comprises a position of a speaker to reproduce the stereophonic sound signal and a distance between a sound source for generating the stereophonic sound signal and a listener.

6. The method of claim 5, wherein the rendering mode comprises a multi-channel rendering mode and a binaural rendering mode.

7. The method of claim 6, wherein the determining of the rendering mode comprises:

determining an initial value of the rendering mode based on the type of the stereophonic sound signal; and determining a final rendering mode to reproduce the stereophonic sound signal, based on the initial value of the rendering mode and the reproduction environment of the stereophonic sound signal.

8. The method of claim 7, wherein the determining the initial value of the rendering mode comprises:

when the type of stereophonic sound signal is foreground sound, determining the binaural rendering mode to be an initial value; and when the type of stereophonic sound signal is background sound, determining the multi-channel rendering mode to be an initial value.

9. The method of claim 8, wherein the determining of the final rendering mode comprises determining whether to change the initial value of the rendering mode based on the distance between the sound source and the listener.

10. An electronic device for reproducing an audio signal, the electronic device comprising:

a processor; and a memory configured to store instructions, wherein the instructions, when executed by the processor, cause the electronic device to:

obtain a type of a stereophonic sound signal determined according to characteristics of the stereophonic sound signal; and determine a rendering mode to reproduce the stereophonic sound signal, based on the type of the stereophonic sound signal and a reproduction environment of the stereophonic sound signal, wherein the type of the stereophonic sound signal comprises foreground sound and background sound.

11. The electronic device of claim 10, wherein the reproduction environment of the stereophonic sound signal comprises a position of a speaker to reproduce the stereophonic sound signal and a distance between a sound source for generating the stereophonic sound signal and a listener.

12. The electronic device of claim 11, wherein the rendering mode comprises a multi-channel rendering mode and a binaural rendering mode.

13. The electronic device of claim 12, wherein the instructions, when executed by the processor, cause the electronic device to:

determine an initial value of the rendering mode based on the type of the stereophonic sound signal; and determine a final rendering mode to reproduce the stereophonic sound signal, based on the initial value of the rendering mode and the reproduction environment of the stereophonic sound signal.

14. The electronic device of claim 13, wherein the instructions, when executed by the processor, cause the electronic device to:

when the type of stereophonic sound signal is foreground sound, determine the binaural rendering mode to be an initial value; and when the type of stereophonic sound signal is background sound, determine the multi-channel rendering mode to be an initial value.

15. The electronic device of claim 14, wherein the instructions, when executed by the processor, cause the electronic device to:

determine whether to change the initial value of the rendering mode based on the distance between the sound source and the listener.

* * * * *